United States Patent [19]

Ando et al.

[11] 4,037,240
[45] July 19, 1977

[54] GRIP FOR A CAMERA

[75] Inventors: Yoshikazu Ando, Musashino; Junichi Yokozato, Kawagoe, both of Japan

[73] Assignee: Zenza Bronica Industries, Inc., Tokyo, Japan

[21] Appl. No.: 708,082

[22] Filed: July 23, 1976

[51] Int. Cl.² .................... G03B 1/00; G03B 29/00
[52] U.S. Cl. ................................ 354/212; 354/82; 354/293
[58] Field of Search ............... 354/82, 293, 212, 204, 354/205, 295, 151

[56] References Cited

U.S. PATENT DOCUMENTS

| | | | |
|---|---|---|---|
| 1,103,418 | 7/1914 | Johnson | 354/204 |
| 2,514,991 | 7/1950 | Doyle et al. | 354/205 |
| 3,408,911 | 11/1968 | Ramos | 354/212 |

FOREIGN PATENT DOCUMENTS

| | | | |
|---|---|---|---|
| 1,429,427 | 1/1966 | France | 354/212 |
| 631,662 | 1/1962 | Italy | 354/293 |

Primary Examiner—John Gonzales
Attorney, Agent, or Firm—Harold L. Stults

[57] ABSTRACT

A grip removably attached to the right side of a camera body which has a film wind-up knob on the right side. The grip has a film wind-up lever which is connected with the film wind-up knob on the camera body by way of a coupling mechanism. The grip is further provided with a shutter release button which is connected with a shutter release mechanism in the camera body by means of a cable release or the like.

9 Claims, 8 Drawing Figures

GRIP FOR A CAMERA

BACKGROUND OF THE INVENTION

Field of the Invention

This invention relates to a grip for a camera, and more particularly to a holding grip removably attached to the body of a camera. The grip for a camera in accordance with the present invention is provided with a film wind-up lever and a shutter release button.

Description of the Prior Art

It is known to use a holding grip attached to a camera body of a camera of large size such as a 2¼ square camera. Since the camera body usually has a film wind-up knob on the right side thereof (viewed from the photographer), the grip is usually attached to the left side so as not to obstruct the operation of the wind-up knob.

However, it is inconvenient and difficult to support the camera body with the left hand and operate the film wind-up knob with the right hand, particularly when the camera is heavy. Further, it is troublesome to move the right hand from the position to support the weight of the camera to the position to operate the wind-up knob, particularly when a quick repeated motion of shutter release is desired for taking snapshots.

SUMMARY OF THE INVENTION

It is the primary object of the present invention to provide a grip for a camera which is attached to the right side of the camera body and provided with a film wind-up lever.

Another object of the present invention is to provide a grip for a camera which is attached to the right side of the camera body and provided with a shutter release button that can be depressed with the right hand used for holding the camera body.

The grip for a camera in accordance with the present invention is provided with a film wind-up lever which is associated with a coupling means that is brought into engagement with a film wind-up knob of the camera when the grip is attached to the camera body. The grip for a camera in accordance with the present invention is further provided with a cable release means which is engageable with a shutter release means provided on the camera body when the grip is attached to the camera body, and is also provided with a shutter release button connected with the cable release means. The so constructed grip of this invention is mounted on the right side of the camera body so that the grip may be supported by the right hand and the film wind-up lever and the shutter release button on the grip may be operated by the right hand which holds the grip.

Said coupling means which is brought into engagement with the film wind-up knob of the camera is a rotatable member having an engaging portion to be engaged with a part of the film wind-up knob. The film wind-up knob of the camera to which the grip in accordance with the present invention is attached should, therefore, have a portion to be engaged with the engaging portion of the rotatable member.

The camera provided with the grip in accordance with the present invention is suitable for taking snapshots. The heavy camera body is supported by both hands, the left hand holding the body itself and the right hand holding the grip, and the film wind-up lever and the shutter release button are operated by the right hand. When the film has a rectangular dimension, e.g. 6 × 9 cm, the body is sometimes rotated by 90° about the optical axis thereof. In such a case, the camera body is positioned below the grip and supported by the left hand from bottom and the grip is held by the right hand and the film wind-up lever and the shutter release button are operated by the right hand.

DESCRIPTION OF THE PREFERRED EMBODIMENTS

Figure 1:
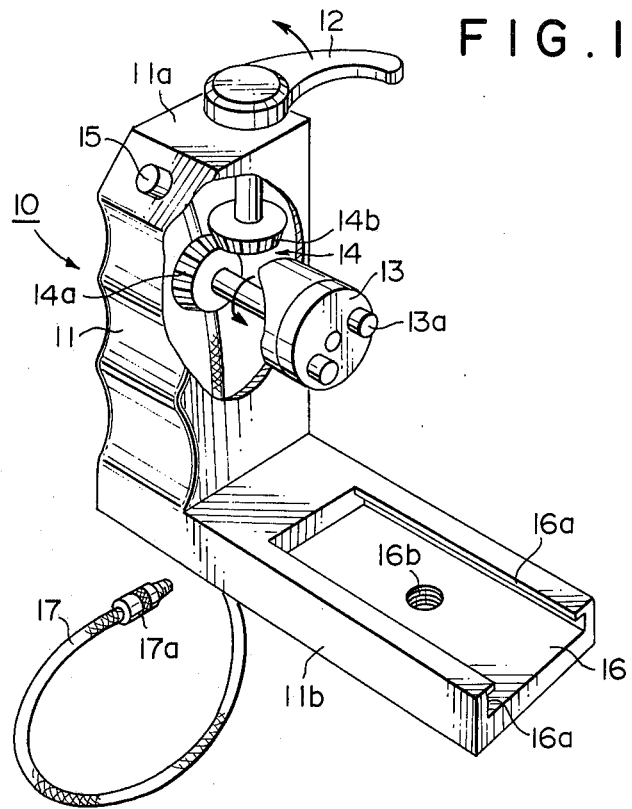
FIG. 1 is a partly broken-away perspective view of an embodiment of a grip for a camera in accordance with the present invention.

FIG. 1 shows an embodiment of the grip for a camera in accordance with the present invention. The grip 10 in accordance with this embodiment is comprised of an elbow-like body 11, a film wind-up lever 12 rotatably mounted on the top 11a thereof, a rotatable member 13 connected with the wind-up lever 12 by way of a gear train 14 and rotated in the direction shown by an arrow by the counterclockwise rotation of the lever 12, and a shutter release button 15 provided on the body 11. The film wind-up lever 12 is used for winding up the film loaded in the camera to which the grip 10 is attached and for charging a shutter mechanism therein.

Figure 2:
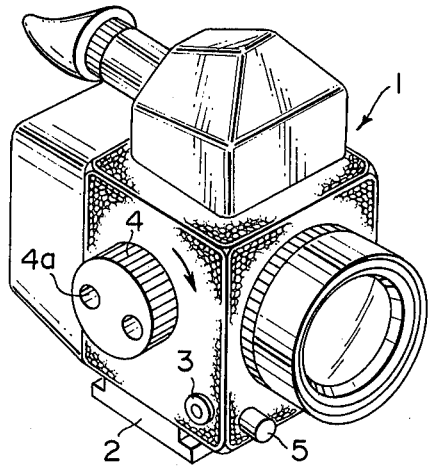
FIG. 2 is a perspective view showing an example of a photographic camera to which the grip in accordance with the present invention is attached.
Figure 3:
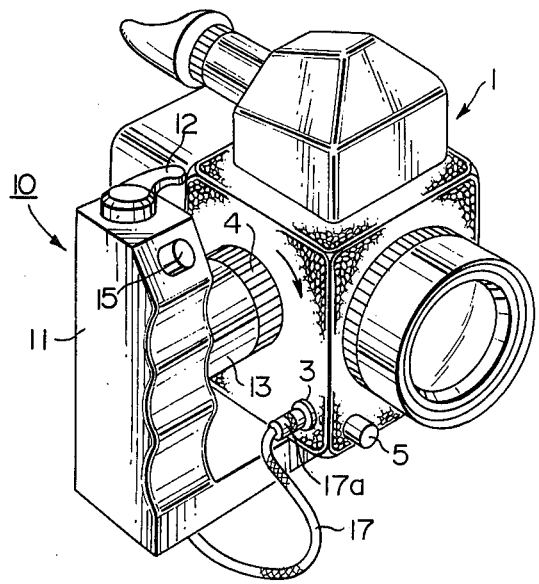
FIG. 3 is a perspective view which shows a camera provided with the grip in accordance with an embodiment of the present invention.

The body 11 has a mounting means 16 in the lower part 11b thereof which is slidably engageable with the bottom of the camera body as shown in FIG. 3. As shown in FIG. 2, the camera body 1 has a mount rail 2 on the bottom thereof. The mount rail 2 extends in parallel to the direction in which the grip 10 is moved to be attached to the camera body 1. The mounting means 16 of the body 11 of the grip 10 has guide grooves 16a and 16a which extend in parallel to each other and are slidably engageable with the rail 2 of the camera body 1. The lower part 11b of the grip 10 is further provided with a through-hole 16b at the center thereof which is brought into alignment with a hole (not shown) provided on the face of the rail 2 when the grip 10 is attached to the camera body 1. A fixing bolt or the like is secured to the hole of the rail 2 through the through-hole16b of the grip 10 to fix the lower part 11b of the grip 10 at a fixed position on the bottom of the camera body 1.

It will be noted that the particular structure of the mounting means 16 as described above is not absolutely necessary if the grip 10 is attached to the camera body 1 by other means, for instance, by means of a screw rod fixed to a tripod socket of the camera body 1.

Said rotatable member 13 is provided with a pair of engaging pins 13a and 13a extending in parallel to said grooves 16a and 16a of the mounting means 16 as shown in FIG. 1 which pins are engageable with a part of the flim wind-up knob of the camera body 1. In the embodiment illustrated in FIG. 1, a pair of bevel gears 14a and 14b constitute said gear train 14 for transmitting the rotation of the film wind-up lever 12 to the rotatable member 13. It will be noted that the gear train 14 can be replaced by various other types of transmission mechanisms. The film wind-up lever 12 is provided with a ratchet means (not shown) for transmitting the rotation of the lever 12 only in one direction to the rotatable member 13. Therefore, the rotatable member 13 is rotated only in one direction to rotate the wind-up knob of the camera in the film wind-up direction.

FIG. 2 shows an example of a camera to which the grip 10 as shown in FIG. 1 is attached. The camera body 1 is provided on the right side thereof with a film wind-up knob 4 having a pair of engaging holes 4a to be engaged with said pair of engaging pins 13a of the rotatable member 13. Further, the camera body 1 has a shutter release means 3 for a cable release means on the right side face thereof. The reference numeral 5 indicates a shutter release button 5.

The grip 10 is further provided with a shutter release button 15 at a position near the top 11a of the grip body 11. The shutter release button 15 is connected with a cable 17 which has a cable release pin 17a at an end thereof as shown in FIG. 1. The cable release pin 17a is inserted into and engaged with the shutter release means 3 of the camera body 1. By depressing the shutter release button 15 on the grip 10, the shutter release means 3 is operated to release the shutter mechanism in the camera body 1.

When the mounting means 16 of the grip 10 is put into slidable engagement with the mount rail 2 of the camera body 1 and the lower part 11b of the grip 10 is fixed to the bottom of the camera body 1 by a screw or the like, said engaging pins 13a and 13a of the rotatable member 13 of the grip 10 is put into engagement with the film wind-up knob 4 of the camera body 1 and the cable release pin 17a is engaged with the shutter release means 3 of the camera body as shown in FIG. 3. Therefore, by turning the wind-up lever 12 of the grip 10 counterclockwise, the film wind-up knob 4 is rotated and the film in the camera body 1 is wound up and the shutter mechanism therein is charged.

Thus, it becomes possible to attach a grip on the right side of the camera body without obstructing the operation of the film-windup knob.

Figure 4:
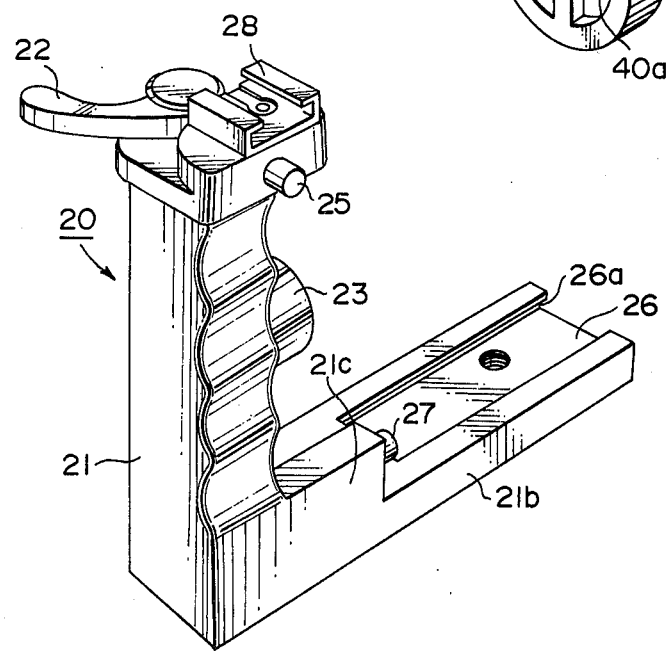
FIG. 4 is a perspective view showing another embodiment of the grip for a camera in accordance with the present invention.

Another embodiment of the grip in accordance with the present invention is illustrated in FIG. 4, in which the elements and parts equivalent to those of the above embodiment shown in FIG. 1 are designated by like reference numerals. The grip 20 in accordance with this embodiment is comprised of an elbow-like body 21, a film wind-up lever 22 rotatably mounted on the top thereof, a rotatable member 23 connected with the wind-up lever 22 by means of a gear train or the like and rotated in one direction by the rotation of the lever 22, a shutter release button 25 provided on the body 21, a mounting means 26 having a pair of grooves 26a formed in the lower part 21b of the body 21, a release pin 27 provided on a face of a stepped portion 21c formed on the lower part 21b of the grip 20 to be put into engagement with the shutter release means 3 provided on the side face of the camera body 1 when the grip 20 is attached to the camera, and an accessory shoe 28 mounted on the top of the body 21. The release pin 27 and the shutter release button 25 are connected with each other by a proper interconnecting means such as a cable so that the release pin 27 is moved in and out of the face of the stepped portion 21c by depressing the shutter release button 25 mounted on the body 21. By so constructing the grip 20, the release pin 27 is automatically put into engagement with the release means 3 of the camera body 1 when the grip 20 is attached to the camera by the slidable engagement of the mounting means 26 with the rail 2. Further, the accessory shoe 28 provides a means for mounting an accessory on the camera.

Figure 5:
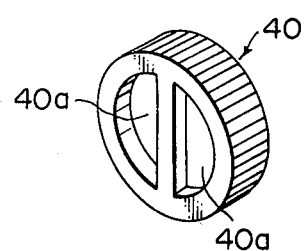
FIG. 5 is a fragmentary perspective view showing an example of a film wind-up knob of a camera which is engageable with a coupling means of the grip in accordance with the present invention.

The film wind-up knob 4 illustrated in FIG. 2 which is rotated by said pair of engaging pins 13a and 13a has a pair of engaging holes 4a. The holes 4a, however, is preferred to be as large as possible, and accordingly, may be in the form of semi-circular recesses 40a as shown FIG. 5. FIG. 5 shows another example of the film wind-up 40 which has a pair of semi-circular recesses 40a and 40a to be emgaged with the engaging pins 13a and 13a of the rotatabe member 13 of the grip 10.

Figure 6:
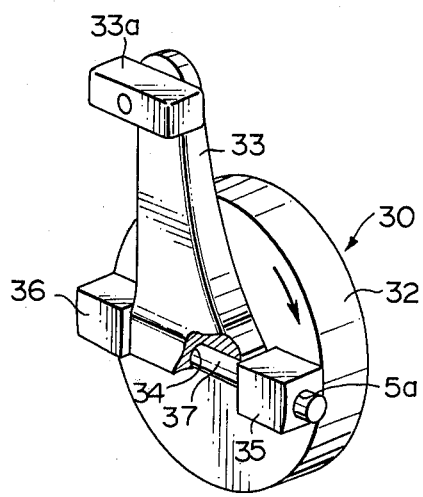
FIGS. 6 and 7 are perspective views showing another example of a film wind-up knob of a camera with which the coupling means of the grip is engageable.
Figure 7:
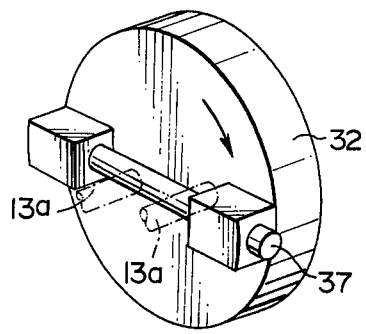
Figure 8:
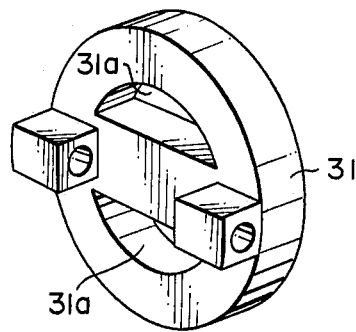
FIG. 8 is a perspective view showing still another example of a film wind-up knob of a camera with which the coupling means of the grip is engageable.

FIGS. 6 to 8 show further examples of the film wind-up knob which are engageable with the engaging pins of the grip of this invention. The film wind-knob 30 as shown in FIG. 6 is composed of a disc shaped rotatable member 32 and a crank lever 33 coupled thereto. The crank lever 33 has at an end thereof a handle 33a and at the other end thereof a through-hole 34. The through-hole 34 is engaged with a pin 7 with which the crank lever 33 is coupled to the rotatable member 30. The rotatable member 30 has on its face a pair of projected portions 35 and 36. One projected portion 35 has a through hole 35a and the other projected portion 36 has a blind hole (not shown). The crank lever 33 is brought to the position where the through-hole 4 thereof is in alignment with the hole 5a and the blind hole of the projected portions 35 and 36, and the pin 7 is inserted into the holes for coupling the crank lever 33 to the rotatable member. The pin 7 is removable from the holes only with a large force. The crank lever 33 is used for rotating the rotatable member 30 to wind up the film. When the grip in accordance with this invention is to be attached to the camera, the pin 7 is removed from the holes and the crank lever 33 is removed from the rotatable member 32. Then, the pin 7 is again inserted into the holes as shown in FIG. 7. Said pair of engaging pins 13a and 13a are engaged with the pin 7 to rotate the rotatable member 32.

A modification of the example shown in FIGS. 6 and 7 is shown in FIG. 8, in which a pair of semi-circular recesses 31a and 31a are formed on the face of the rotatable member 31 similarly to said example shown in FIG. 5. In this example, the pair of engaging pins 13a and 13a of the rotatable member 13 of the grip 10 are engaged with the recesses 31a and 31a. Therefore, it is not necessary to insert the pin 7 into the holes after the crank lever 33 is removed.

We claim:

1. A grip for a camera removably attached to a camera which has a film wind-up knob on the right side thereof comprising a grip body removably attached to the camera body on the right side thereof, a rotatable member engageable with a film wind-up knob of the camera for transmitting the rotation thereof in one direction to the knob, a film wind-up lever rotatably mounted on the grip body, and transmission means provided in the grip body for transmitting the rotation of the film wind-up lever to the rotatable member.

2. A grip for a camera as defined in claim 1 wherein said grip body has a mounting means which is slidably engageable with a part of the camera body and said rotatable member has engaging pins extending in parallel to the direction in which said mounting means is slidably with respect to the camera body.

3. A grip for a camera as defined in claim 2 wherein said mounting means is a pair of grooves which is slidably engageable with a rail formed on the bottom of the camera body.

4. A grip for a camera as defined in claim 2 wherein said rotatable member has a pair of engaging pins extending in parallel to the axis of rotation thereof and located symmetrically with respect to the axis.

5. A grip for a camera as defined in claim 1 wherein said transmission means is a gear train connected with both said film wind-up lever and said rotatable member.

6. A grip for a camera removably attached to a camera body which has a film wind-up knob on the right side thereof comprising a grip body removably attached to the camera body on the right side thereof, a rotatable member engageable with a film wind-up knob of the camera body for transmitting the rotation thereof in one direction to the knob, a film wind-up lever rotatably mounted on the grip body, a transmission means provided in the grip body for transmitting the rotation of the film wind-up lever to the rotatable member, a shutter release button provided on the grip body, a shutter release pin engageable with a shutter release means provided on the camera body, and means for transmitting the depression of the shutter release button to said shutter release pin.

7. A grip for a camera as defined in claim 6 wherein said means for transmitting the depression of the shutter release button to said shutter release pin is a cable and said shutter release pin is fixed to an end of the cable.

8. A grip for a camera as defined in claim 7 wherein said pin is fixed to the grip body at the position where the fixed pin is brought into engagement with the shutter release means provided on the camera body.

9. A grip for a camera as defined in claim 6 further comprising an accessory shoe provided on the top of the grip body.

* * * * *